Figure 1:
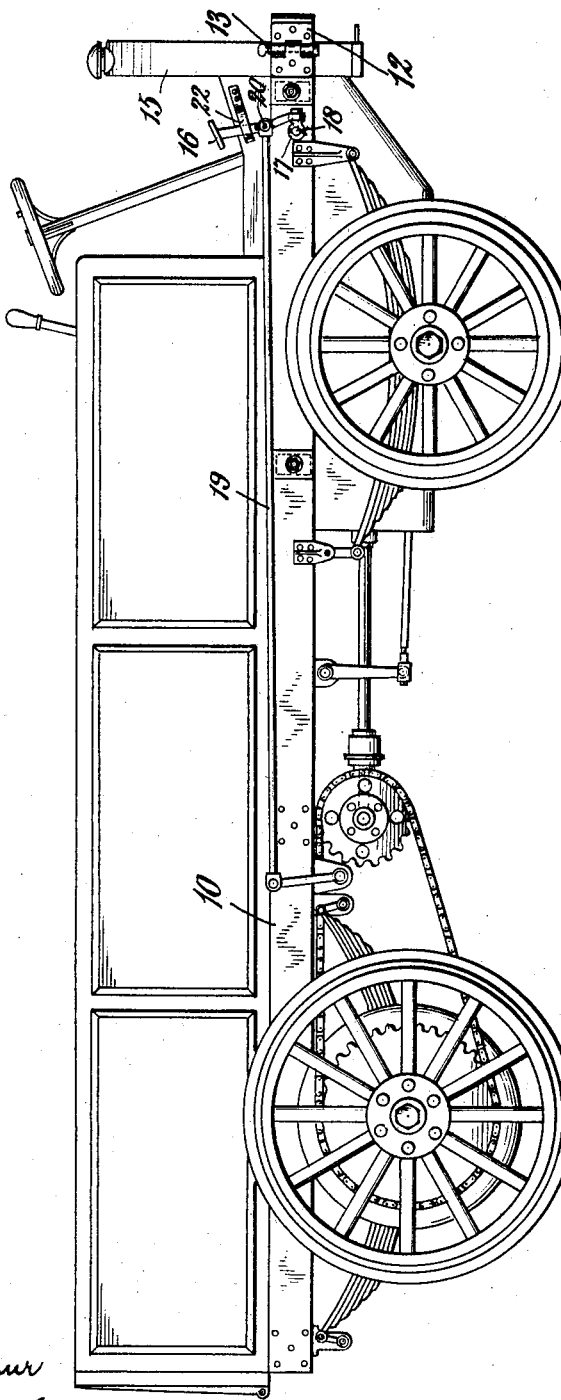

C. A. CARLSON.
MOTOR VEHICLE.
APPLICATION FILED FEB. 2, 1910.

974,746.

Patented Nov. 1, 1910.
3 SHEETS—SHEET 1.

WITNESSES:

INVENTOR
Charles A. Carlson
BY
his ATTORNEYS

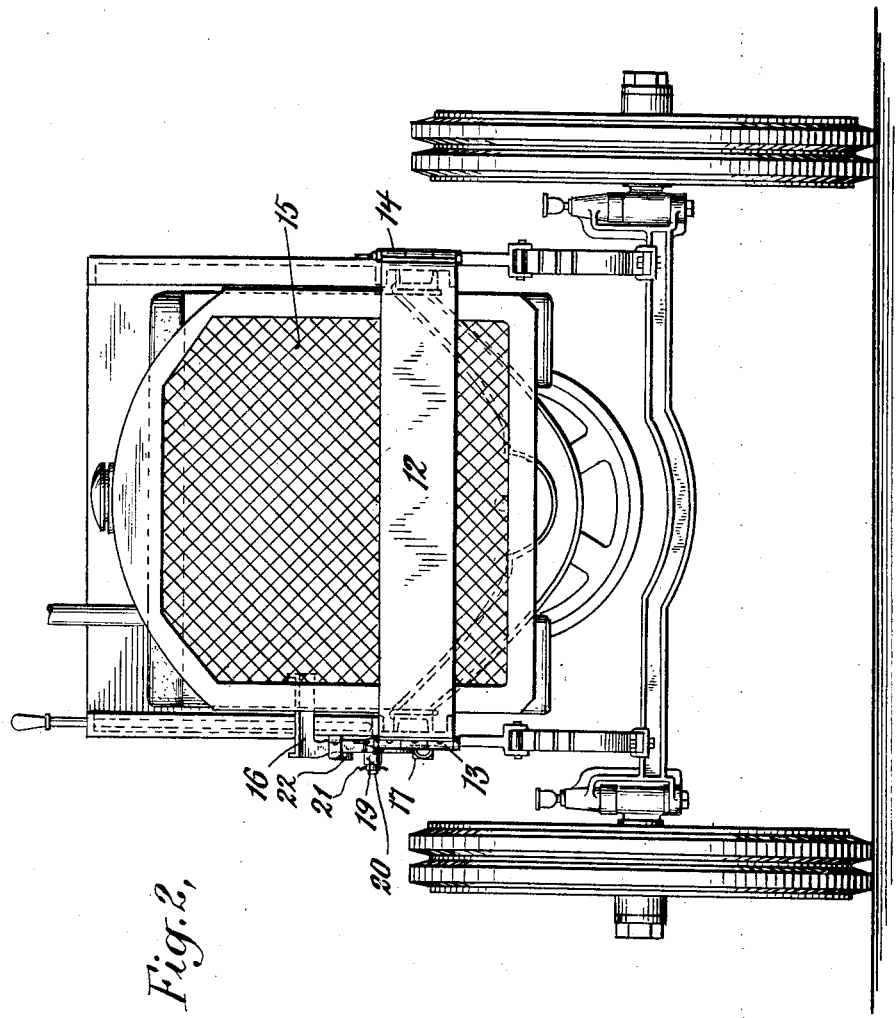

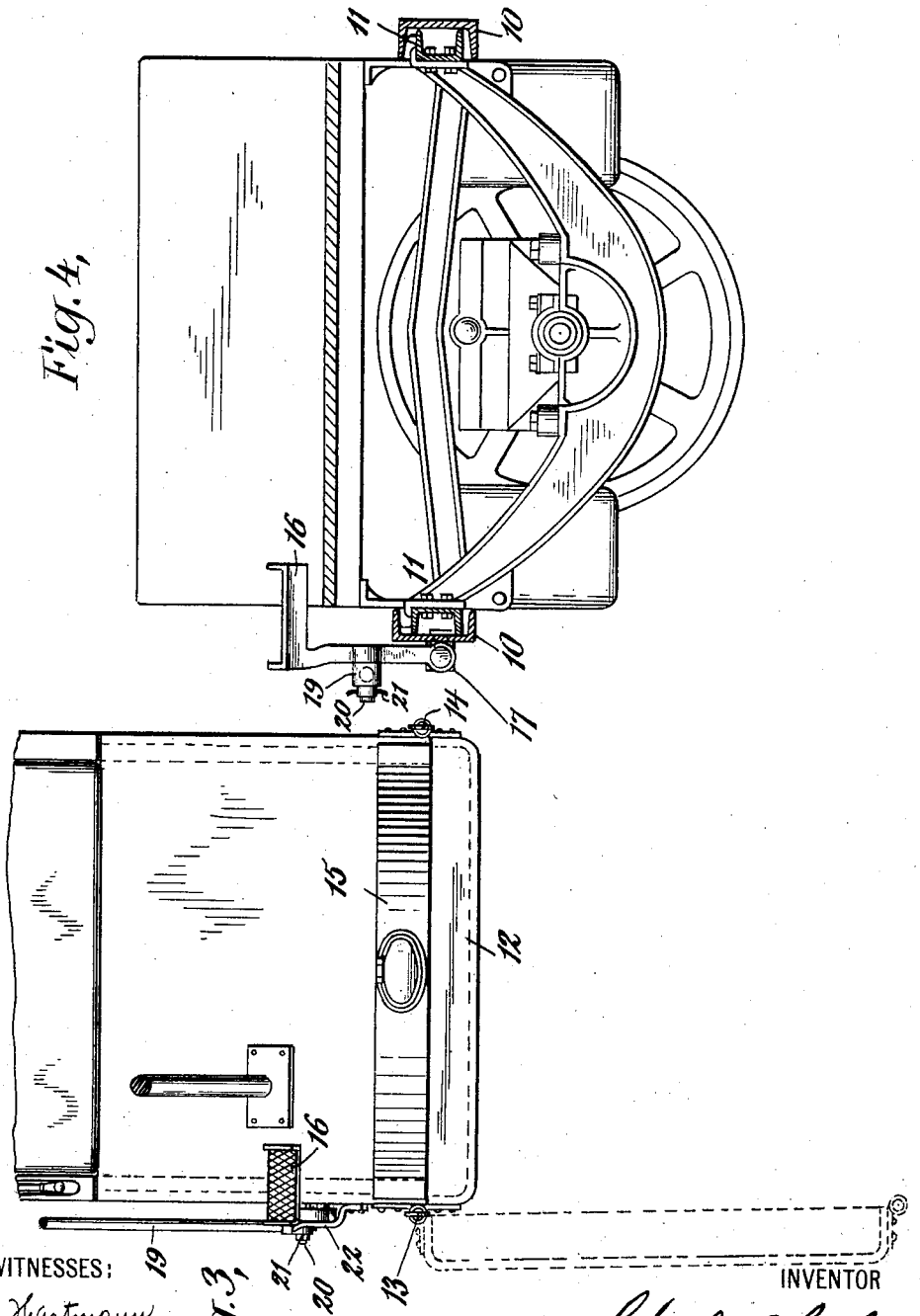

UNITED STATES PATENT OFFICE.

CHARLES A. CARLSON, OF BROOKLYN, NEW YORK, ASSIGNOR TO CARLSON MOTOR & TRUCK COMPANY, OF PHILADELPHIA, PENNSYLVANIA, A CORPORATION OF NEW YORK.

MOTOR-VEHICLE.

974,746.  Specification of Letters Patent.  Patented Nov. 1, 1910.

Application filed February 2, 1910. Serial No. 541,413.

*To all whom it may concern:*

Be it known that I, CHARLES A. CARLSON, a citizen of the United States of America, and a resident of Brooklyn, county of Kings, and State of New York, have invented certain new and useful Improvements in Motor-Vehicles, of which the following is a specification, reference being had to the accompanying drawings, forming a part thereof.

My invention relates to motor vehicle construction, and particularly to motor vehicles of the type in which the power plant is arranged as a part mounted upon a separate and independent frame disposed in sliding relation with the main frame and longitudinally removable therefrom at the front of the vehicle.

My invention consists in a construction permitting a brake pedal to be carried by the main frame while extending over the supplemental removable frame and in the path of parts to be removed therewith, the said pedal being laterally movable out of the way of such parts when the parts are being thus removed.

In order that my invention may be fully understood, I will now proceed to describe an embodiment thereof, having reference to the accompanying drawings illustrating the same, and will then point out the novel features in claims.

In the drawings: Figure 1 is a view in side elevation of such portions of a motor vehicle constructed in accordance with my invention as are necessary to illustrate the invention. Fig. 2 is a front view of the same. Fig. 3 is a top view of the forward portion of the vehicle. Fig. 4 is a transverse sectional view through the forward portion of the vehicle.

The motor vehicle illustrated comprises a main frame 10 which carries the vehicle body and the supporting wheels, and a supplemental frame 11 which carries the power plant. The main frame comprises two longitudinal side irons, conveniently in channel form, the flange portions thereof facing inwardly (see Fig. 4), while the supplemental frame includes two longitudinal channel irons which face in the opposite direction, the said channel irons being smaller than the channel irons of the main frame and received within the channel portions thereof. For a full and clear understanding of a vehicle constructed in this manner I refer to a copending application filed by me on the 25th day of May, 1909, and serially numbered 498,281. For the present application, however, it is sufficient merely to understand that the supplemental frame is removable longitudinally from engagement with the main frame at the front end of the vehicle.

In the construction shown herein a transverse bar is disposed across the front of the vehicle, being hinged or pivoted at 13 to one of the side irons of the main frame, and connected by a pin connection 14 with the other side iron. By removing the pin 14 the beam may be swung aside to permit the removal of the supplemental frame, while when in place the said beam will brace the longitudinal side irons and will act as a buffer to protect the radiator 15, as will be well understood by reference to the drawings. This feature while illustrated herein is not claimed in the present case owing to a Patent Office requirement for division as between this feature and the brake pedal construction which I will now proceed to describe.

In this type of vehicle the brake pedal for the vehicle is preferably disposed upon the outside of the main frame in order that it shall not interfere with the removal of the power plant, and it is so shown in my copending application above referred to. I have found, however, in actual practice that when positioned as in the application above referred to, the portion for engagement with the foot is too far out of line with the operator, for practical purposes. For this reason I have devised the form of pedal shown in the present application, in which the portion 16 to be engaged by the foot of the operator is constructed as an overhanging part, and in the path of parts to be removed with the supplemental frame. In order to permit the removal of the supplemental frame and parts carried thereby, I have pivoted the pedal upon a block 17 to swing laterally thereon with respect to the length of the frame of the vehicle, the said block being itself pivoted upon a stud 18 upon the side of the frame about which the pedal and block are adapted to swing in a path longitudinal of the vehicle. The pedal is connected by means of any suitable link or other connecting element 19, with the brake operating means, which latter may be of any suitable or desired character. The link 19 is preferably connected to the pedal by means of a stud 20 which extends laterally from the said pedal, a cotter pin 21 being arranged for retaining the link in place. An overhanging arm 22, conveniently secured to the removable frame, engages the pedal laterally and tends to guide it in its position.

When it is desired to remove the power plant the front beam 12 is first swung out of the way and the power plant is then drawn out sufficiently to cause the arm 22 to clear the pedal; thereafter the pedal may be swung laterally about its pivotal connection upon the block 17, to allow the power plant to be removed entirely, the connecting link 19 springing sufficiently to permit of the required lateral movement of the pedal. If preferred, the cotter pin 21 may be removed and the link 29 disconnected from the pedal, in which case the pedal can be thrown all the way down. If this connecting rod is removed in this manner the pedal may first be thrown downward about its pivot 18 so as to clear the guide 22 before any movement is imparted to remove the power plant; the pedal being thereafter thrown over laterally about its pivot upon the block 17 and the power plant then removed as before. By this construction I am enabled to bring the pedal sufficiently in line with the operator to permit him to operate it without any difficulty.

What I claim is:

1. In a motor vehicle, the combination with a main frame, and a supplemental frame in longitudinal sliding relation therewith, of a pedal pivoted upon the main frame to move longitudinally with respect thereto and having a part overhanging portions carried by the supplemental frame, and means permitting the pedal to be moved laterally out of the path of the parts carried by the supplemental frame while the same is being removed.

2. In a motor vehicle, the combination with a main frame, and a supplemental frame in longitudinal sliding relation therewith, of a pedal pivoted upon the main frame to move longitudinally with respect thereto and having a part overhanging portions carried by the supplemental frame, means permitting the pedal to be moved laterally out of the path of the parts carried by the supplemental frame when the same is being removed; and a guide carried by the supplemental frame for engaging the said pedal and preventing the same from being so laterally moved while the supplemental frame is in its normal rest position in the main frame.

3. In a motor vehicle, the combination with a main frame, and a supplemental frame in longitudinal sliding relation therewith, of a block pivoted upon the main frame to move longitudinally with respect thereto, and a pedal pivoted upon the said block to move laterally with respect thereto, the said pedal having a portion arranged to normally overhang parts carried by the supplemental frame, and held normally against lateral pivotal movement with respect to the said block.

4. In a motor vehicle, the combination with a main frame, and a supplemental frame in longitudinal sliding relation therewith, of a block pivoted upon the main frame to move longitudinally with respect thereto, a pedal pivoted upon the said block to move laterally with respect thereto, the said pedal having a portion arranged to normally overhang parts carried by the supplemental frame, and a guide carried by the supplemental frame for normal engagement with the pedal to prevent its lateral movement.

CHARLES A. CARLSON.

Witnesses:
 D. HOWARD HAYWOOD,
 LYMAN S. ANDREWS, Jr.